United States Patent [19]

Newberth, III et al.

[11] Patent Number: 5,618,857

[45] Date of Patent: Apr. 8, 1997

[54] IMPREGNATION SEALANT COMPOSITION OF SUPERIOR HIGH TEMPERATURE RESISTANCE, AND METHOD OF MAKING SAME

[75] Inventors: Frederick F. Newberth, III, West Hartford, Conn.; Martin S. Colton, LongMeadow, Mass.; Canh M. Tran, W. Hartford, Conn.

[73] Assignee: Loctite Corporation, Hartford, Conn.

[21] Appl. No.: 259,378

[22] Filed: Jun. 14, 1994

Related U.S. Application Data

[63] Continuation of Ser. No. 82,336, Jun. 24, 1993, abandoned.

[51] Int. Cl.$^6$ ............................................. C09J 4/02
[52] U.S. Cl. ............................ 523/176; 526/262; 528/322
[58] Field of Search ................................ 526/262, 258, 526/320, 321; 524/291; 523/176; 528/322

[56] References Cited

U.S. PATENT DOCUMENTS

| | | | |
|---|---|---|---|
| Re. 32,240 | 9/1986 | DeMarco | 526/328 |
| 3,672,942 | 6/1972 | Neumann et al. | 427/295 |
| 3,988,299 | 10/1976 | Malofsky | 526/262 |
| 4,147,831 | 4/1979 | Young | 428/356 |
| 4,391,686 | 7/1983 | Miller et al. | 204/159.15 |
| 4,416,921 | 11/1983 | Dunn | 427/353 |
| 4,533,446 | 8/1985 | Conway et al. | 204/159.24 |
| 4,556,701 | 12/1985 | Schindler et al. | 526/282 |
| 4,632,945 | 12/1986 | Garcia et al. | 523/176 |
| 4,674,980 | 6/1987 | Ibsen et al. | 433/228.1 |
| 4,688,712 | 5/1987 | Hino et al. | 522/13 |
| 4,743,647 | 5/1988 | Domier | 526/262 |
| 4,806,608 | 2/1989 | Klemarczyk | 526/262 |
| 4,965,331 | 10/1990 | Jackson et al. | 526/262 |
| 5,059,665 | 10/1991 | Eisenbarth et al. | 526/262 |
| 5,075,398 | 12/1991 | de Koning et al. | 526/262 |
| 5,219,647 | 6/1993 | Sinlelyn et al. | 429/36 |
| 5,250,643 | 10/1993 | Corley | 526/323.1 |
| 5,302,679 | 4/1994 | Maandi et al. | 526/262 |
| 5,359,020 | 10/1994 | Brunner et al. | 526/262 |

FOREIGN PATENT DOCUMENTS

| | | |
|---|---|---|
| 2641955 | 3/1977 | Germany . |
| 3070729 | 3/1991 | Japan . |
| 3297150 | 10/1991 | Japan . |

OTHER PUBLICATIONS

Product Brochure LT-969, "Introducing L.I.S./Loctite Impregnation Systems," 16 pages, copyright 1985 Loctite Corp.

*Primary Examiner* — Tae Yoon
*Attorney, Agent, or Firm* — Steven J. Hultquist

[57] ABSTRACT

A curable impregnation sealant composition comprising a curable monomer, e.g., a (meth)acrylic acid ester monomer, of a type adapted for curing by heat and/or substantial absence of oxygen, and a curable monomer-soluble reactive bismaleimide of a type and in a solubilized amount providing enhanced high temperature resistance in the impregnation sealant composition when cured.

17 Claims, 5 Drawing Sheets

5,618,857

IMPREGNATION SEALANT COMPOSITION OF SUPERIOR HIGH TEMPERATURE RESISTANCE, AND METHOD OF MAKING SAME

This is a continuation of application Ser. No. 08/082,336 filed Jun. 24, 1993, now abandoned.

BACKGROUND OF THE INVENTION

1. Field of the Invention

This invention relates generally to impregnation sealant compositions, comprising a curable monomer adapted for curing by heat and/or substantial absence of oxygen. More specifically, the invention relates to an impregnation sealant composition of such type, having superior high temperature resistance properties, and to a method of making same.

2. Description of the Related Art

Impregnation sealing of porosity in porous parts frequently is carried out by introducing sealant compositions into porosity under a pressure differential, by well known techniques, or by wicking methods in which the impregnation sealant is flowed across the surface of a porous part and allowed to enter into the voids thereof by capillary action during a selected period of time.

Such impregnation sealing of porosity is used in the manufacture of porous metal parts and other porous materials and structures, to avoid problems incident to microporosity. Such problems include air, gas and fluid leakage susceptibility, which may create processing or finishing problems, as well as difficulties in the end use of the porous member. Sealing of porosity thus is employed to render parts leak-proof in character and to prevent or minimize the incidence of internal corrosion, when metal parts are involved. The development of impregnation sealing compositions used in the production of castings, diecastings, electronic components, powder metal parts, sintered components, fiberglass composites, and other materials and structural elements continues to be a significant field of development.

The sealant compositions typically employed in the aforementioned impregnation applications include a wide variety of self-curing anaerobic sealants, which are curable via free radical polymerization in the presence of suitable free-radical initiators, e.g., peroxy-type initiators, as well as thermal (heat)-curing sealants, and sealants which cure by both anaerobic and heat cure mechanisms.

As used herein, the term "anaerobic" refers to substantial absence of oxygen, and sometimes hereinafter is referred to as an anoxic condition, in reference to the cure environment of a specific curable composition.

Illustrative of (meth)acrylic monomer-based anaerobic impregnant compositions known in the art are U.S. Pat. Nos. 3,672,942; 3,969,552; Reissue U.S. Pat. No. 32,240; and U.S. Pat. No. 4,632,945. Thermal-curing sealant compositions include the compositions described in U.S. Pat. No. 4,416,921 and U. K. Patent Specifications 1,308,947 and 1,547,801.

Anaerobic cure impregnation sealants have significant advantages including rapid cure time and good cured sealant properties, but typically are provided as two-part compositions, one including the monomer to be polymerized, and the other part containing a catalytic accelerator of polymerization, so that upon mixing of such parts, the composition is continuously aerated or otherwise maintained in an oxic (oxygen exposure) condition until polymerization is desired.

Heat-curing (meth)acrylic monomer-containing impregnant compositions, by contrast, may be effectively used with a minimum of monitoring and maintenance, with little or no aeration or oxic conditions being required. Such impregnant compositions may cure at temperatures ranging from 40° C. to 150° C., depending on the specific formulation employed.

Once the heat-curable impregnant composition is introduced into the porosity of the parts to be sealed, the parts typically are transferred to an agitated water rinse zone for removal of any remaining surface accumulations of sealant or extraneous sealant which is trapped in blind holes of the impregnated parts. After removal of the excess sealant, the impregnated parts are passed to a tank containing hot water, e.g., at a temperature of 90° C.–200° C., or other medium at elevated temperature which serves to cure the sealant composition in the porosity.

In the case of anaerobic cure impregnant sealant compositions, the impregnant composition is likewise introduced into the porosity of the parts to be sealed, and the parts are transferred to an agitated water rinse zone for removal of any excess surface accumulations of sealant or extraneous sealant which is trapped in blind holes of the impregnated parts. After such removal of excess sealant, the impregnated parts typically are passed to a tank containing a catalyst activator solution which serves to cure the sealant composition at the entrance to the porosity. This creates a hardened plug or cap in the outer portion of the pores, trapping the remaining resin for anaerobic self-cure.

A problem with curing of impregnation sealants, associated with heating of the impregnant sealing composition (for curing in the case of thermal cure compositions, and for accelerating cure in the case of anaerobic sealant compositions), is termed "bleed out," in which loss of resin from pores occurs due to a combination of opening of the pores with increasing temperature, thermal expansion of the sealant resin, and reduced viscosity of the resin at elevated temperatures. Such bleed out phenomenon causes a loss of sealing effectiveness, and also can account for sticky residues that sometimes are left on parts after curing of sealant.

In addition to the foregoing, both heat-cure and anaerobic sealants may be prone to thermal degradation during exposure to high temperatures, even though kinetically such elevated temperature may enhance the kinetic rate of polymerization of the monomer in the impregnant composition.

In general, there is a significant need in the art for porosity impregnation sealants which can function without adverse affect at high temperatures.

Although a number of high temperature resin systems have evolved in various application fields other than porosity impregnation, such as epoxies, phenolics, polyimides, polysulfones and the like, such resins have not been contemplated for porosity impregnation applications, for various reason, including viscosity characteristics, the extremely high temperatures which are required in some instances to effect curing thereof, and the comparatively long curing times required to reach substantially full cure properties. By contrast, (meth)acrylic resins have been almost exclusively used in porosity impregnation applications, due to their highly advantageous viscosity characteristics, and rapid curability in anaerobic cure and/or heat-cure formulations. In addition, the cure conditions required for heat-curing (meth)acrylic impregnation sealant compositions are relatively mild in contrast to polyimides, phenolics, polysulfones, and heat-curing epoxies.

Accordingly, it would be a significant advance in the art to provide a curable impregnation sealant composition having superior high temperature resistance when cured, as well as the good viscosity and rapid cure characteristics of (meth)acrylic resin-based systems currently in use.

Accordingly, it is an object of the present invention to provide such impregnation sealant compositions which utilize currently known (meth)acrylic resins in their formulations, and thus retain the rapid cure character of such resins, and which moreover have good viscosity characteristics which remain stable even under elevated temperature conditions in their curing, and which have superior high temperature resistance properties in the cured state.

Other objects and advantages will be more fully apparent from the ensuing disclosure and appended claims.

SUMMARY OF THE INVENTION

In one aspect, the present invention relates to a curable impregnation sealant composition, comprising a curable monomer of a type adapted for curing by heat and/or substantial absence of oxygen, and a curable monomer-soluble reactive bismaleimide of a type and in a solubilized amount providing enhanced temperature resistance in the impregnation sealant composition when cured.

Particularly preferred reactive bismaleimides which are usefully employed in the sealant compositions broadly described above, include bismaleimides of the formula:

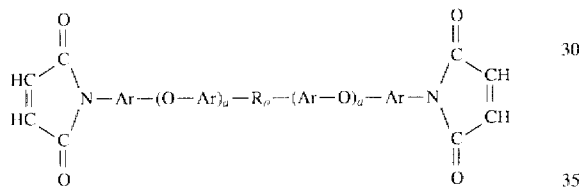

wherein a is an integer having a value of 0 to 2; Ar is substituted or unsubstituted arylene, e.g., phenylene which when substituted has $C_1$–$C_4$ alkyl substituents; and $R_O$ is $C_1$–$C_4$ alkylene, e.g., methylene (—$CH_2$—) or propylene (—$C(CH_3)_2$—).

As used herein, the term "curable monomer-soluble reactive bismaleimide" means a bismaleimide compound which is soluble to the extent of at least one percent by weight in the curable monomer, and which is reactive with the curable monomer to interpolymerize or cross-link with same to yield a cured polymer containing moieties deriving from the bismaleimide.

As used herein, the term "enhanced high temperature resistance" in respect of the impregnation sealant composition (in the cured state) means that the cured composition has a higher temperature resistance than the corresponding impregnation sealant composition lacking the monomer-soluble reactive bismaleimide component, with high temperature resistance being measured by thermal gravimetric analysis in accordance with the method of ASTM E 1131-B6 ("Standard Test Method for Compositional Analysis by Thermogravimetry" and evidenced by the cured composition weight retention level at temperatures above 200° C. In this respect, a sealant composition having superior high temperature resistance would retain at least 50% of its original weight at a temperature of 200° C. and at least 25% of its original weight at a temperature of 300° C.

The curable monomer employed in the impregnation sealant composition of the present invention may be of any suitable type, as for example including phenolic resins, vinyl resins, silicone resins, epoxy resins, etc., however (meth)-acrylic resins are preferred, for the reasons set out hereinabove in the "Background of the Invention" section hereof discussing such resins. As used herein, the term "(meth) acrylic" is intended to be broadly construed to include acrylic resins per se as well as corresponding methacrylic resins, within the scope of such term.

Further, while the invention could potentially be employed with resins curing by moisture exposure, UV radiation, and other cure modalities, the invention in preferred practice utilizes a curable monomer which is cured by heat and/or substantial absence of oxygen, consistent with the compositions, methodology and process system layout conventionally employed for sealant impregnation of porous parts.

In specific aspects, the invention relates to particular heat cure impregnant sealant formulations, and in other aspects relates to particular anaerobic cure formulations.

In a method aspect, the present invention relates to a method of providing enhanced high temperature in a cured impregnation sealant composition formed by heat and/or anoxic curing of a curable impregnation sealant composition including a curable monomer, comprising incorporating in the curable impregnation sealant composition an amount of a curable monomer-soluble reactive bismaleimide which is effective to confer such enhanced high temperature resistance.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
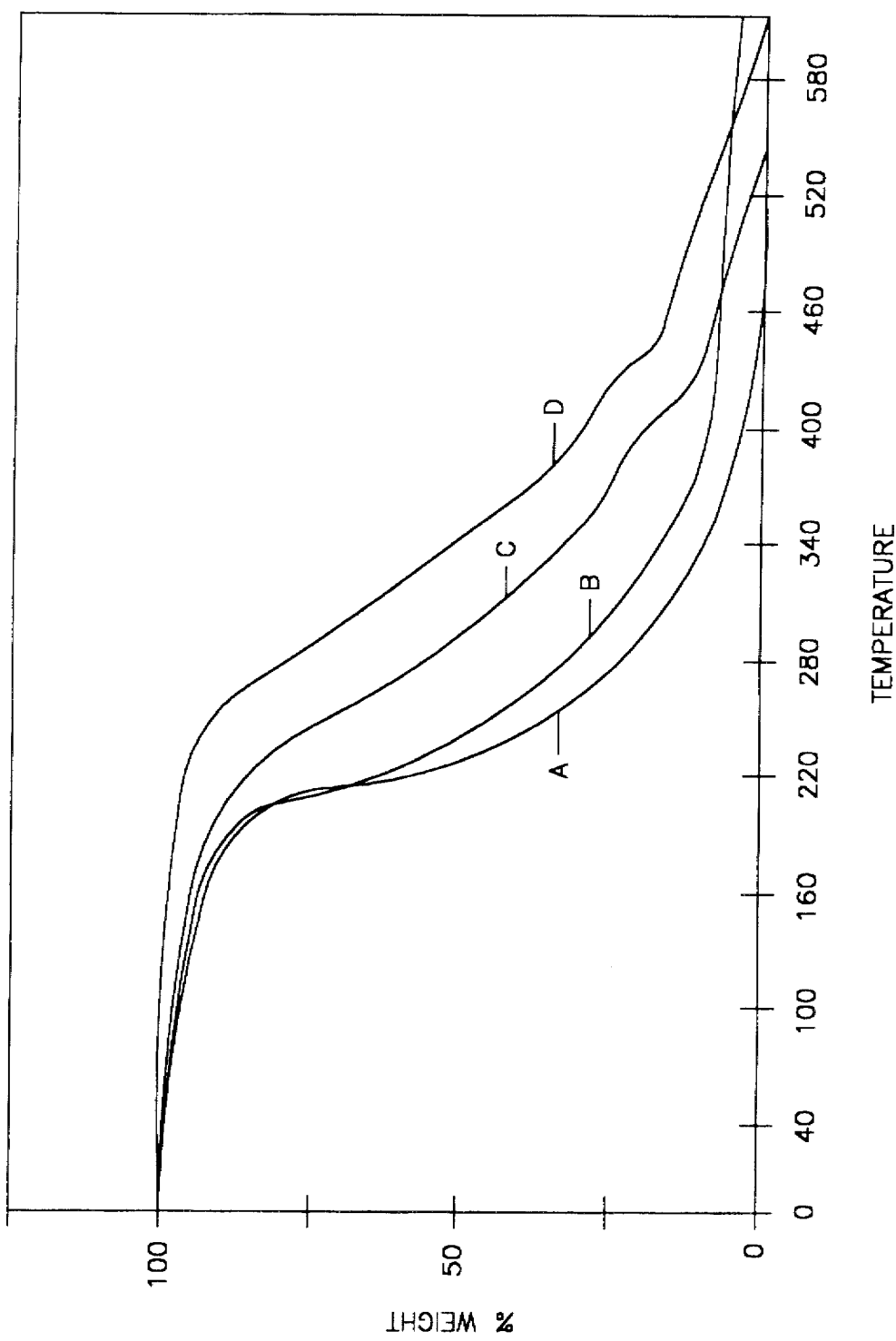
FIG. 1 is a thermal gravimetric analysis plot of data, showing curves exemplary of various impregnation sealant compositions, plotted with percent of original weight as a function of temperature in degrees Centigrade.

The present invention is based on the unexpected discovery that curable monomer-soluble reactive bismaleimides may be employed in (meth)acrylic resin-containing impregnation sealant compositions, to significantly enhance high temperature resistance of the cured sealant composition, with retention of good viscosity characteristics, and stable viscosity values during curing. As a result of such superior high temperature resistance characteristics being realized in the cured impregnant sealant composition of the invention, the bleed-out problems discussed hereinabove, are ameliorated along with other drawbacks of conventional impregnation sealant compositions.

This discovery is particularly unexpected, since the addition of standard bismaleimide materials to impregnation sealant compositions significantly interferes with impregnation of porous parts and does not lead to a homogenous solution of the bismaleimide component, and correspondingly (once cured), the polymer containing standard bismaleimide materials is highly heterogeneous in character.

In contrast to such standard bismaleimides which are not soluble in monomers employed in the impregnation sealant composition, the monomer-soluble reactive bismaleimides provide homogenous solutions of the curable impregnant composition, and corresponding homogeneity of the cured polymeric sealant composition. In addition, the monomer-soluble reactive bismaleimides provide acceptable viscosity characteristics for porosity impregnation, and assist in reducing the aforementioned bleed-out phenomenon.

Further, despite their advantageous properties including use temperature ranges on the order of –65° C. to about 230° C., standard bismaleimide resins when cured have the disadvantage of an extremely brittle character, which would appear to render such resins disadvantageous and unsuitable for formulation in an impregnant sealant composition demanding good structure integrity of the impregnated material. Contrariwise, the monomer-soluble bismaleimide-containing sealant compositions of the present invention when cured possess good structural integrity and materials properties.

Accordingly, it is highly unexpected that the monomer-soluble reactive bismaleimides in fact yield good structural properties in the cured sealant material and provide homogeneity both in the curable impregnant composition as well as the corresponding cured material.

Preferred monomer-soluble reactive bismaleimides in the broad practice of the present invention include those in which the maleimide groups are terminal groups separated by a linking moiety comprising a polyarylene chain, preferably comprising from 2–4 phenylene groups, and a central $C_1$-$C_4$ alkylene group, wherein the arylene rings when substituted are preferably substituted by $C_1$-$C_4$ alkyl substituents, and wherein adjacent arylene groups in the chain optionally may be separated by oxo (—O—) groups, as for example when a multiplicity of phenylene rings is present in the chain of the linking moiety.

Particularly preferred bismaleimide components of the curable impregnant sealant composition of the present invention include those of the formula:

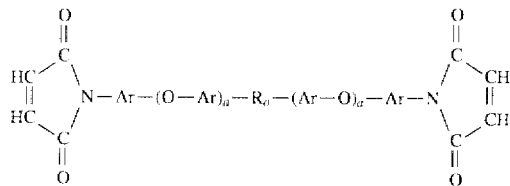

wherein a is an integer having a value of from 0 to 2; Ar is arylene, which as indicated may be substituted or unsubstituted, and when substituted, preferably comprises $C_1$-$C_4$ alkyl substituents; and $R_O$ is $C_1$-$C_4$ alkylene, e.g., methylene or propylene. Most preferably, the aryl substituents in the above formula are phenylene, and most preferably the bismaleimide linking group, —Ar—(O—Ar)$_a$—R$_O$—(Ar—O)$_a$—Ar—, is selected from the group consisting of:

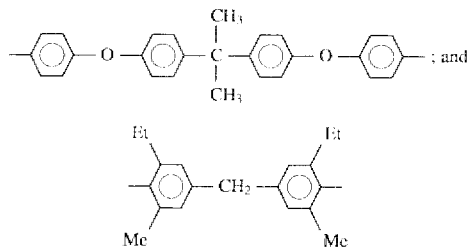

The concentration of the monomer-soluble bismaleimide in the impregnation sealant composition suitably is from about 1 to about 25% by weight, based on the weight of the curable monomer. Preferably, the concentration is from about 1 to 15% by weight, more preferably from about 2 to 12% by weight, and most preferably from about 5 to about 10% by weight, on the same curable monomer weight basis.

The curable monomer employed in the impregnant sealant composition of the invention may be of any suitable type, and resins including epoxies, phenolics, silicones, vinyl resins, sulfone resins, etc. are within the contemplation of the invention as the resin or monomer component thereof. Preferably, however, the curable monomer is a (meth)acrylic acid ester monomer, consistent with the advantages of good processing properties and rapid cure time discussed hereinabove, and the demonstrated utility of (meth)acrylic resins, which constitute the predominant class of resins conventionally used in impregnation sealant compositions.

The (meth)acrylic monomer which is employed in the preferred impregnation sealant composition of the invention, may be a single (meth)acrylic component, or a mixture of different (meth)acrylate species. In any event, the (meth)acrylic constituent is polymerized to yield corresponding polymer from the (meth)acrylic monomer. Preferably at least a portion of the (meth)acrylic monomer comprises a di- or other poly(meth)acrylate ester. These polyfunctional monomers produce cross-linked polymers, which serve as more effective and more durable sealants. While various (meth)acrylic monomers may be used, the most highly preferred are poly(meth)acrylate esters which have the following general formula:

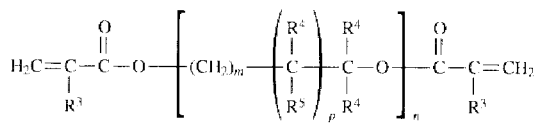

wherein: $R^4$ represents a radical selected from the group consisting of hydrogen, lower alkyl of from 1 to about 4 carbon atoms, hydroxyalkyl of from 1 to about 4 carbon atoms, and

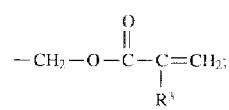

$R^3$ is a radical selected from the group consisting of hydrogen, halogen, and lower alkyl of from 1 to about 4 carbon atoms; $R^5$ is a radical selected from the group consisting of hydrogen, hydroxyl, and

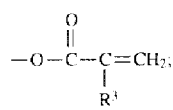

m may be 0 to 12, and preferably from 0 to about 6; n is equal to at least 1, e.g., 1 to about 20 or more, and preferably between about 2 to about 6; and p is 0 or 1.

The polymerizable poly(meth)acrylate esters corresponding to the above general formula are exemplified by, but not restricted to, the following materials; di-, tri- and tetraethyleneglycol dimethacrylate, dipropyleneglycol dimethacrylate; polyethyleneglycol dimethylacrylate; di(pentamethyleneglycol) dimethyacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; and neopentylglycol diacrylate.

While poly(meth)acrylate esters, especially the poly(methy)acrylate esters described in the preceding paragraphs, are useful in (meth)acrylate-based impregnant compositions, monofunctional (meth)acrylate esters (esters containing one (meth)acrylate group) are also advantageously used.

The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in the (meth)acrylate-based impregnant compositions.

When monofunctional (meth)acrylate esters are employed in the impregnant composition, it is preferably to use an ester which has a relatively polar alcohol moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen, heterocylic ring, hydroxy, amino, cyano, and halogen polar groups. Typical examples of compounds within this category are cyclohexylmethacrylate, tetrahydrofurfuryl methacrylate, hydroxethyl acrylate, hydroxypropyl methacrylate, t-butylaminoethyl methacrylate, cyanoethylacrylate, and chloroethylmethacrylate.

Other (meth)acrylates can also be used in the porosity impregnant composition of the present invention. However, these (meth)acrylates preferably are used in combination with one or more poly(meth)acrylate or monofunctional esters. In impregnant compositions comprising a mixture of mono- and di(meth)acrylates, the mono(meth)acrylate monomer may suitably constitute from about 20 to about 80 percent by weight of the total weight of mono- and di(meth)acrylate monomers. Most preferably, poly(meth)acrylates having the chemical formula given above, comprise at least a portion, preferably at least about 50 percent by weight, of the (meth)acrylates in the impregnant material.

The (meth)acrylic monomers in heat-curable impregnant compositions may be curable through a free-radical mechanism, with a heat-cure initiator being present therein, or an initiator system comprising a redox polymerization initiator (i.e., an ingredient or a combination of ingredients which at the desired elevated temperature conditions produce an oxidation-reduction reaction, resulting in the production of free radicals. Suitable initiators may include peroxy materials, e.g., peroxides, hydroperoxides, and peresters, which under appropriate elevated temperature conditions decompose to form peroxy free radicals which are initiatingly effective for the polymerization of the (meth)acrylic monomer.

A preferred class of heat-curing initiators for (meth)acrylic monomer-containing impregnant compositions comprises azonitrile compounds which yield free radicals when decomposed by heat. Heat is applied to cure the composition, and the resulting free radicals polymerize the monomer.

The azonitrile may be a compound of the formula:

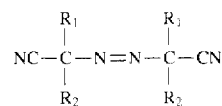

wherein:

$R_1$ is a methyl, ethyl, n-propyl, iso-propyl, iso-butyl or n-pentyl radical, and $R_2$ is a methyl, ethyl, n-propyl, iso-propyl, cyclopropyl, carboxy-n-propyl, iso-butyl, cyclobutyl, n-pentyl, neopentyl, cyclopentyl, cyclohexyl, phenyl, benzyl, p-chlorobenzyl, or p-nitrobenzyl radical or $R_1$ and $R_2$, taken together with the carbon atom to which they are attached, represent a radical of the formula

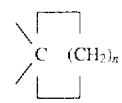

wherein n is an integer from 3 to 9, or the radical

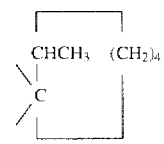

Compounds of the above formula, and impregnant compositions comprising same, are more fully described in U.S. Pat. No. 4,416,921, the disclosure of which hereby is incorporated herein by reference.

Azonitrile initiators of the above-described formula are readily commercially available, e.g., the initiators which are commercially available under the trademark VAZO® from E. I. DuPont de Nemours and Company, Inc. (Wilmington, Del.), including VAZO® 52 ($R_1$=methyl, $R_2$=isobutyl), VAZO® 64 ($R_1$=methyl, $R_2$=methyl), and VAZO® 67 ($R_1$=methyl, $R_2$=ethyl), all such $R_1$ and $R_2$ substituents being identified with reference to the above-described azonitrile general formula.

A preferred azonitrile initiator is 2,2'-azobis(iso-butyronitrile).

The azonitrile may be employed in the heat-curable impregnant composition in concentrations on the order of 500 to 10,000 parts per million (ppm) by weight, preferably 1000 to 5000 ppm.

Other (meth)acrylic monomer-based impregnant compositions of a heat-curable character may be employed in the broad practice of the present invention, including those disclosed in UK Patent Specifications 1,308,947 and 1,547,801. As described in those references, the monomeric impregnant composition may contain suitable inhibitors serving to restrict or preclude the occurrence of polymerization of the monomer, at temperatures below those desired or recommended for heat-curing of the impregnant composition.

The (meth)acrylic monomer in anaerobic cure porosity impregnant compositions of the present invention may be associated with polymerization initiator constituents which under certain conditions, i.e., in the substantial absence of oxygen, function to induce polymerization of the monomer(s). The (meth)acrylic monomers employed in such porosity impregnant compositions may be curable through a free-radical mechanism, with an initiator being present therein, or an initiator system comprising a redox polymerization initiator (i.e., an ingredient or a combination of ingredients which produce an oxidation-reduction reaction, resulting in the production of free radicals). Suitable initiators may include the same peroxy materials described hereinabove in connection with heat-cure impregnant formulations of the invention.

In addition to initiator components, the impregnant composition may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide; formamide; and compounds containing transition metals, such as copper octanoate.

The impregnant composition may also contain other constituents, such as: other co-monomer species; reactive diluents; pigments; surfactants; fillers; polymerization inhibitors; stabilizers, anti-oxidants; anti-corrosion additives; etc.

The impregnation sealant compositions of the invention are suitably non-aqueous, i.e., substantially water-free, in character. The viscosity of the impregnation sealant composition of the invention suitably does not exceed about 100,000 centipoise, and preferably such viscosity is less than 100 centipoise, most preferably below about 50 centipoise. As used herein, viscosity values are those measured by the Cannon-Fenske method.

When a peroxy polymerization initiator is employed in the impregnation sealant composition, such initiator typically does not comprise more than about 10% by weight of the composition, and preferably does not comprise more than about 5% of the composition by weight. Most preferably, the peroxy polymerization initiator used in compositions of the invention comprises from about 0.2% to about 3% by weight of the composition. The weight percent of peroxy polymerization initiator typically is not below about 0.1%, since below that rate the cure rate becomes unsuitably low.

Frequently, it is desirable to add one or more co-monomers to the curable monomer, e.g., (meth)acrylic monomer, to modify the viscosity, solvent resistance, or other characteristics of the cured or uncured composition. While mixtures of (meth)acrylates generally may be employed successfully, other saturated co-monomers can be used as well. Such co-monomers typically will be monomers capable of relatively rapid vinyl-type polymerization so that they can co-polymerize, at least to a limited extent, with the reactive acrylate monomers. For example, (meth)acrylic functionality-containing resins, such as epoxy acrylate and urethane acrylate oligomers and prepolymers, may be potentially usefully employed.

When such co-monomers are used, they preferably should not be used in amounts which exceed about 50% of the total weight of the (meth)acrylate monomer in the composition. Other ingredients can be added as discussed hereinabove, provided that they do not adversely affect the impregnation sealing function of the composition.

An illustrative impregnation sealant composition of the present invention contains a (meth)acrylic monomer component including 70%–75% of a dimethacrylate ester and 25%–30% of the monomethyacrylate ester, wherein the amounts of respective acrylate monomers are by weight, and the respective weight percentages of the dimethacrylate and the monomethacrylate esters total to 100%, in combination with 0.25% peroxy initiator, 0.3% polymerization accelerator (e.g., benzosulfimide), and 0.05% inhibitor, e.g., hydroquinone, wherein the non-acrylate component concentrations are by weight, based on the weight of total monomer. Such illustrative impregnation sealant composition may also utilize a small amount of a suitable fluorescent additive, e.g., about 0.02% by weight, based on the weight of total monomer, of a fluorescent indicator such as the fluorescent composition commercially available under the trade name Natmar Scanning Compound No. 5 (Angstrom Technology, Florence, Ky).

Illustrative commercially available impregnation sealing compositions which may be utilized in the practice of the present invention, as modified by addition thereto of a monomer-soluble reactive bismaleimide, include Resinol® 90C sealant (Loctite Corporation, Hartford, Conn.), a heat-cured (meth)acrylic ester formulation which is curable at temperature levels on the order of 90° C. and above (e.g., 90° C.–150° C.), and Resinol® RTC sealant (Loctite Corporation, Hartford, Conn.), an anaerobic cure sealant composition curable at ambient (e.g., room temperature) conditions in the substantial absence of oxygen.

Among preferred commercially available monomer-soluble reactive bismaleimides usefully employed in the broad practice of the present invention are the bismaleimides commercially available from Mitsubishi Yuka America, Inc., (New York, N.Y.) under the trademark Thermax™, including Thermax™ 7000, and Thermax™ 8000 maleimide resins, and Skybond 3000 and 3030 bismaleimide resins commercially available from Monsanto Chemical Company (St. Louis, Mo.). Such preferred resins preferably are employed at concentrations of from 1% to 12% by weight, based on the weight of the (meth)acrylic resin in the preferred (meth)acrylic resin-containing impregnation sealant composition.

In the preparation of bismaleimide-modified impregnation sealant compositions of the present invention, the monomer-soluble reactive bismaleimide may simply be blended or mixed into the previously formulated impregnation sealant composition, under gentle mixing or agitated conditions, optionally utilizing gentle heating where required to solubilize the desired amount of bismaleimide in the monomer or resin component of the formulation.

Subsequently, when the impregnation sealant composition is impregnated in porosity of the parts to be sealed, the impregnated parts may be heated to effect heat-curing of the composition with polymerization of the resin or monomer component of the impregnant, and cross-linking of the bismaleimide with the polymerizable monomer or resin, in the case of heat-cure sealant formulations. Alternatively, in the case of anaerobic-cure formulations, the sealant composition may also heated after impregnation has been effected, in order to effect cross-linking of the bismaleimide with the polymerizable resin or monomer of the sealant composition, and to accelerate the anaerobic cure.

In some applications, however, involving non-thermal curing impregnation sealing composition, such heating may be omitted and curing may be carried out at ambient (e.g., room temperature) conditions, i.e., without heating of the impregnant material, and in such instances the bismaleimide will enhance the properties of the sealant composition, however, the high temperature resistance properties of the impregnant are significantly increased when the polymerizable impregnant is heated to cause cross-linking of the bismaleimide with the monomer component of the sealant composition. In some instances involving anaerobic cure formulations, for example, it may be desired to carry out partial or initial polymerization of the monomer under non-elevated temperature, anaerobic conditions, and to then effect a heating to consolidate the bismaleimide and the monomer as an interpolymerized reaction product. Thus, secondary heating and post-cure heat treatment of the sealant composition is contemplated in the broad practice of the invention.

It will be recognized that the monomer or resin components of the impregnation sealant composition may be widely varied in the broad practice of the present invention, and that the specific bismaleimide may likewise be varied in accordance with the invention, subject to the constraints that the bismaleimide is sufficiently soluble in the monomer resin component(s) of the impregnant composition to improve the high temperature resistance properties of the cured composition, and that the monomer is otherwise compatible and efficacious in respect of the materials properties of the cured sealant.

The features and advantages of the present invention are more fully shown by the following non-limiting examples, wherein all parts and percentages are by weight, unless otherwise expressly stated.

EXAMPLE I

A first heat-cure impregnation sealant formulation, (hereafter denoted as Formula 1, was made up, with the composition set out in Table 1 below. For comparison purposes, a high temperature sealant formulation, hereafter denoted as Formula 2, was formulated having the composition shown in Table 1 below, and containing ethoxylated bisphenol A dimethylacrylate to increase the temperature resistance of the cured sealant.

Table 2 sets out the concentration of monomer-soluble reactive bismaleimide, which included Thermax™ MB 7000 and Thermax™ MB 8000 bismaleimides (Mitsubishi Yuka America, Inc., New York, N.Y.), at the various identified concentrations (numbers given are percents by weight, based on weight of (meth)acrylic monomer in the composition). Sample 1 corresponds to Formula 1 of Table 1 without any bismaleimide modification, and Samples 2–13 comprised the Formula 1 composition as modified with the named bismaleimide material in the specified amount.

TABLE 1

| COMPONENT | Formula 1 | Formula 2 |
|---|---|---|
| TRIETHYLENE GYLCOL DIMETHACRYLATE | 74.00 | 50.912 |
| LAURYL METHACRYLATE | 15.00 | 10.296 |
| HYDROXYPROPYLMETHACRYLATE | 5.00 | 3.428 |
| ETHOXYLATED BISPHENOL A DIMETHACRYLATE | — | 29.961 |
| BIS(NONYLPHENOXYPOLY(ETHYLENEOXYETHYL)FUMARATE (SURFACTANT) | 5.17 | 5.048 |
| FLUORESENCE | 0.02 | 0.014 |
| HYDROQUINONE | 0.05 | 0.100 |
| BHT | 0.06 | 0.041 |
| CHELATOR(ACETOPHOSPHONIC ACID) | 0.20 | 0.200 |
| VAZO 67 INITIATOR | 0.50 | 0.500 |
| TOTAL | 100.00 | 100.50 |

Each of the above-described Formulae 1 and 2 then were formulated in various compositions, as described in Tables 2 and 3 below.

TABLE 2

| Sample No. | Bismaleimide Name, Concentration | Viscosity, Centipoise | Solubility | |
|---|---|---|---|---|
| | | | Initial | after 38° F. |
| — | — | — | — | — |
| 1 | — | 9.01 | OK | OK |
| 2 | Thermax MB 7000 1% | 9.52 | OK | OK |
| 3 | Thermax MB 7000 5% | 11.38 | OK | OK |
| 4 | Thermax MB 7000 10% | 15.58 | OK | ♥PART |
| 5 | Thermax MB 8000 1% | 9.58 | OK | OK |
| 6 | Thermax MB 8000 5% | 11.98 | OK | OK |
| 7 | Thermax MB 8000 8% | 14.28 | OK | OK |
| 8 | Thermax MB 8000 1% | 9.89 | OK | OK |
| 9 | Thermax MB 8000 5% | 11.72 | OK | Ok |
| 10 | Thermax MB 8000 10% | 15.63 | ♥PART | ♥PART |
| 11 | Thermax MB 8000 1% | 10.02 | OK | OK |
| 12 | Thermax MB 8000 5% | 12.00 | ♥PART | OK |
| 13 | Thermax MB 8000 8% | 14.12 | ♥PART | OK |

♥PART = PARTICLES WERE SEEN IN SOLUTION

Table 3 contains corresponding information for the Formula 2 composition. Sample 14 corresponds to Formula 2 of Table 1, without bismaleimide modification, and Samples 15–26 were Formula 2 formulations modified by bismaleimides as specified in Table 3.

TABLE 3

| Sample No. | Bismaleimide Name, Concentration | Viscosity, Centipoise | Solubility Initial | Solubility after 38° F. |
|---|---|---|---|---|
| 14 | — | 20.52 | OK | OK |
| 15 | Thermax MB 7000 1% | 21.84 | OK | OK |
| 16 | Thermax MB 7000 5% | 26.30 | OK | OK |
| 17 | Thermax MB 7000 8% | 30.70 | OK | OK |
| 18 | Thermax MB 8000 1% | 22.26 | OK | OK |
| 19 | Thermax MB 8000 5% | 29.77 | OK | OK |
| 20 | Thermax MB 8000 8% | 33.91 | OK | OK |
| 21 | Thermax MB 8000 1% | 22.16 | OK | OK |
| 22 | Thermax MB 8000 5% | 27.56 | OK | ♥PART |
| 23 | Thermax MB 8000 8% | 32.70 | OK | ♥PART |
| 24 | Thermax MB 8000 1% | 22.59 | OK | OK |
| 25 | Thermax MB 8000 5% | 29.55 | OK | OK |
| 26 | Thermax MB 8000 8% | 35.09 | OK | ♥PART |

♥PART – PARTICLES WERE SEEN IN SOLUTION

Tables 2 and 3 set out the values of viscosity, in centipoise, and in the monomer solubility both initially and after temperature adjustment to 38° F. The solubility data are characterized either as "OK" reflecting the good solubility characteristics of the formulation, "♥PART" denoting the visual observation of particles in the impregnant solution.

The formulation of Formula 2 included ethoxylated bisphenol A dimethacrylate to increase the temperature resistance of the polymer formed by polymerization of the (meth)acrylate components of the formulation.

The data in Tables 2 and 3 show that the viscosity increase of samples containing bismaleimide (Samples 2–13 and 15–26) were proportional to the increase in concentration of the bismaleimide component, and that such viscosity increases did not excessively increase the viscosity (i.e., the viscosity with even high levels of bismaleimide component being of acceptable character for purposes of porosity impregnation).

The respective Formulae 1 and 2 next were subjected to testing by thermogravimetric analysis by the test method of ASTM E 1131-B6 ("Standard Test Method for Compositional Analysis by Thermogravimetry"), and the results are shown in FIGS. 1–4 hereof.

FIG. 1 is a thermogravimetric analysis (TGA) plot of percent weight retention as a function of temperature in degrees Centigrade for Formula 1. Curve A represents the Formula 1 composition with no added bismaleimide. Curve B represents the Formula 1 composition with 1% addition of bismaleimide. Curve C represents the Formula 1 composition with 5% added bismaleimide, and Curve D represents the Formula 1 composition with 10% added bismaleimide.

As shown by the FIG. 1 curves, the unmodified formulation (devoid of any bismaleimide therein) exhibited a substantially greater weight loss than the bismaleimide-modified compositions, with the percent of weight retained of the original formulation being higher with increasing bismaleimide concentration, reflecting the fact that such increasing levels of monomer-soluble reactive bismaleimide resulted in less degradative loss of mass of the composition, thereby showing the substantial increase in high temperature resistance of the bismaleimide-containing compositions over the corresponding unmodified composition at high temperature levels on the order of 300° C. and higher.

Figure 2:
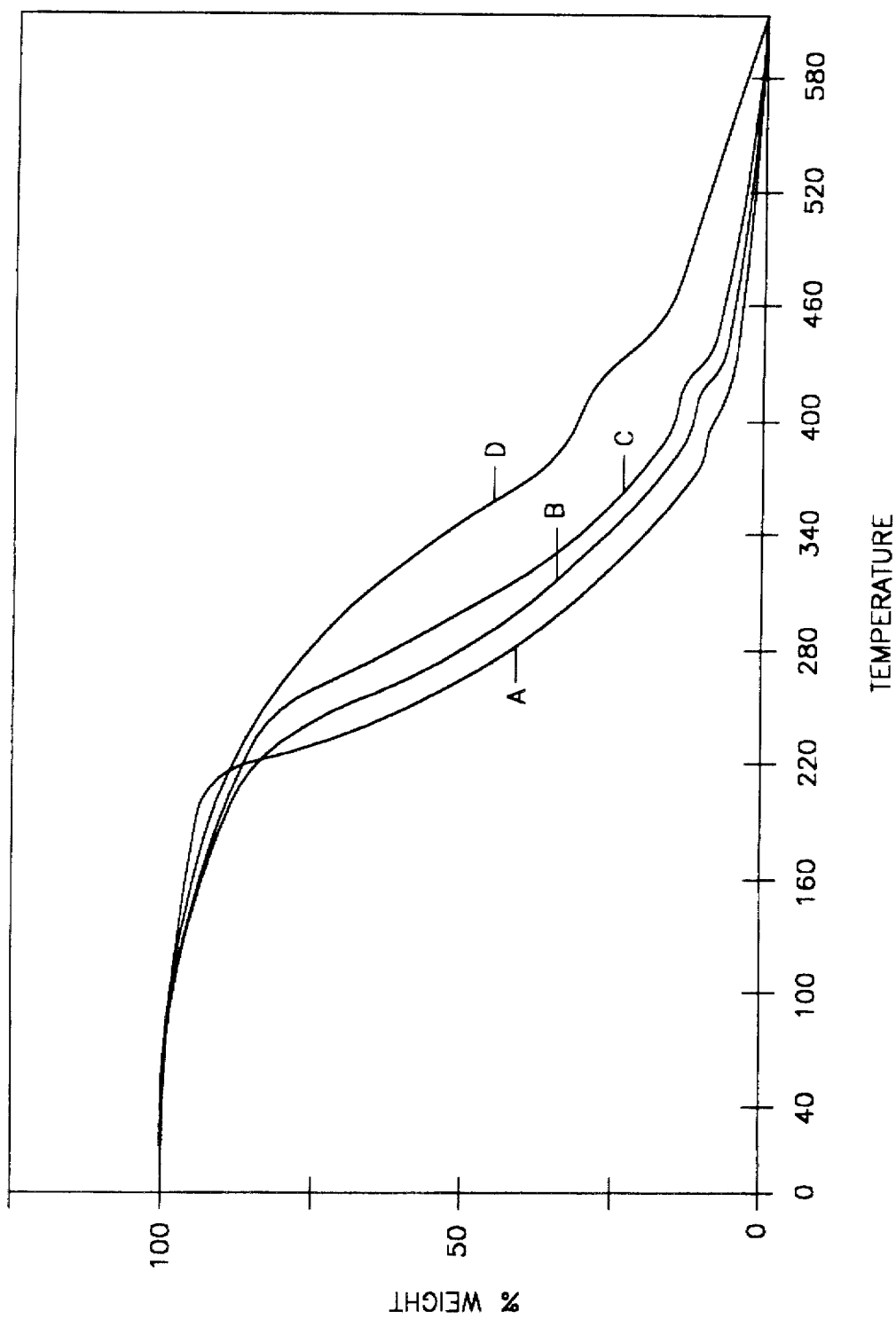
FIG. 2 is a thermal gravimetric analysis plot of percent of original weight as a function of temperature in degrees Centigrade, for various impregnation sealant compositions of the type represented in FIG. 1, but which have been post-cured at elevated temperature.

Similar relative performance is shown in the TGA plot of FIG. 2, which shows curves for unmodified and bismaleimide-modified formulations of Samples 1–4 (corresponding to curves A, B, C and D, respectively), wherein the samples after their formulation were subjected to post-cure elevated temperature exposure at 300° F. for 3 hours, to promote complete cross-linking of the bismaleimide additive and innerpolymerization of the bismaleimide component with the (meth)acrylic monomer and corresponding polymer.

Figure 3:
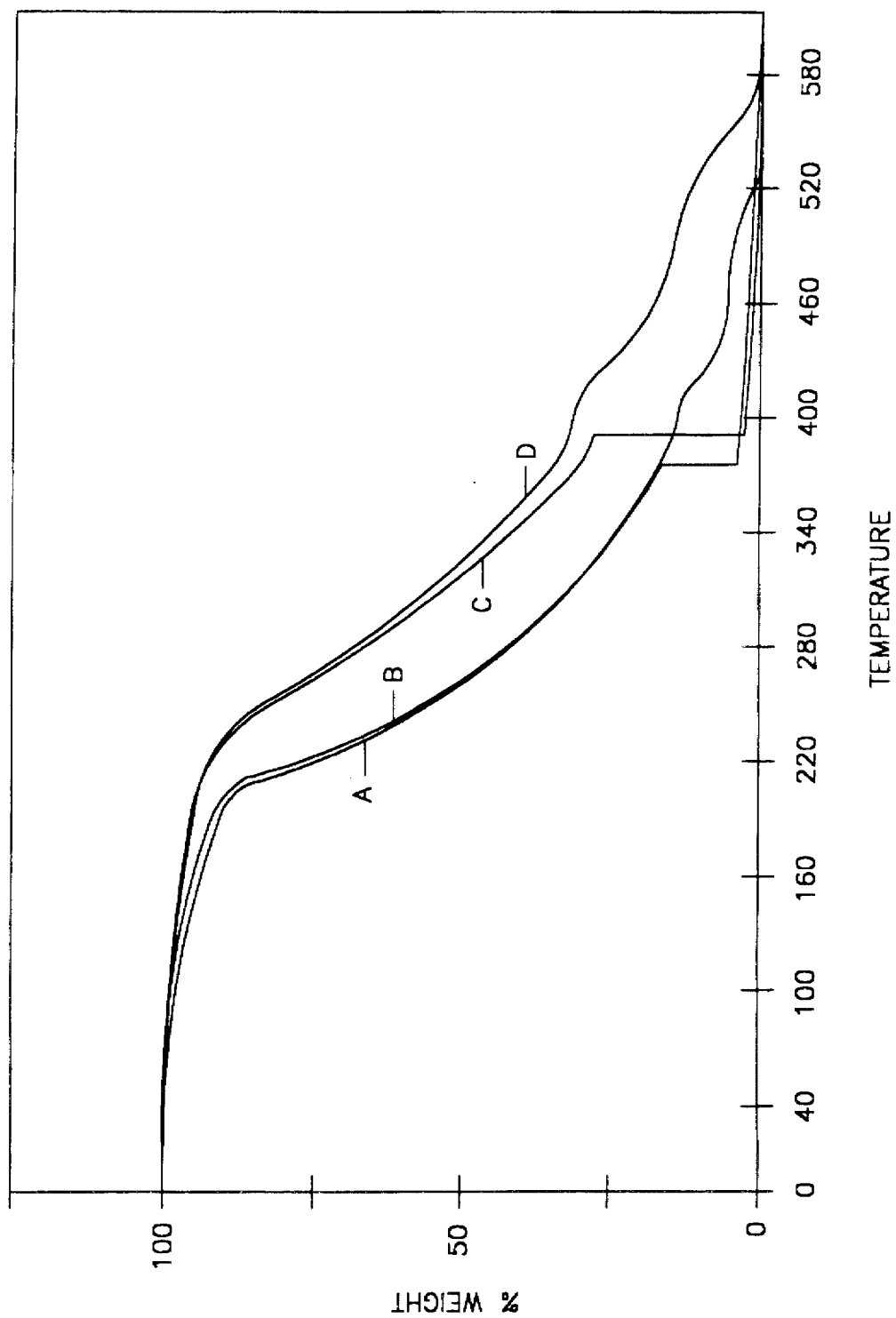
FIG. 3 is a thermal gravimetric analysis plot of percent retention of original weight as a function of temperature in degrees Centigrade, for another impregnation sealant composition.
Figure 4:
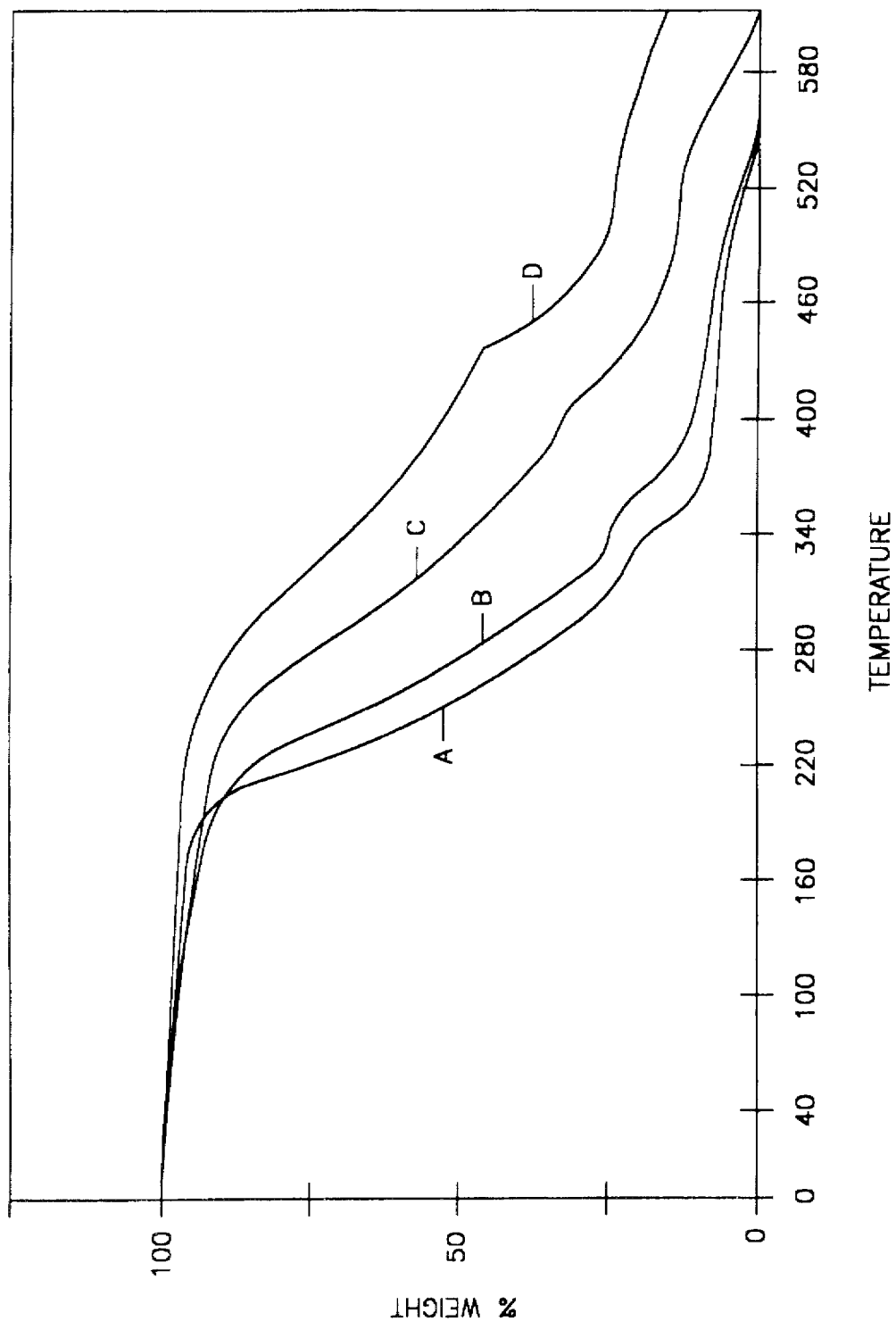
FIG. 4 is a thermal gravimetric analysis plot of percent retention of original weight, as a function of temperature in degrees Centigrade, for various formulations of the type for which curves are shown in the graph of FIG. 3, but which have been post-cured at elevated temperature.

FIG. 3 is a TGA plot of data for Formula 2 Samples 14–17 (corresponding to curves A, B, C, and D, respectively). FIG. 4 is a TGA plot of the weight retention/temperature performance of Samples 14–17 after being subjected to post-cure treatment at elevated temperature for 3 hours at 300° F. Again, the data in FIGS. 3–4 show that increasing levels of bismaleimide component resulted in enhancement of the high temperature resistance of the modified formulations, as compared with the unmodified corresponding composition.

EXAMPLE II

An impregnation sealant formulation curable at ambient (e.g., room temperature) conditions in the substantial absence of oxygen (hereafter denoted as Formula 3), was made up, with the composition set out in Table 4 below. In this Table, the composition of Formula 2 (see Example 1) also has been set out for comparison purposes.

TABLE 4

| COMPONENT | Formula 3 | Formula 2 |
|---|---|---|
| TRIETHYLENE GYLCOL DIMETHACRYLATE | 74.00 | 50.912 |
| LAURYL METHACRYLATE | 15.00 | 10.296 |
| HYDROXYPROPYLMETHACRYLATE | 5.00 | 3.428 |
| ETHOXYLATED BISPHENOL A DIMETHACRYLATE | — | 29.961 |
| BIS(NONYLPHENOXYPOLY(ETHYLENEOXYETHYL)FUMARATE (SURFACTANT) | 5.24 | 5.048 |
| FLUORESCENCE | 0.02 | 0.014 |
| HYDROQUINONE | — | 0.100 |
| BHT | — | 0.041 |
| CHELATOR(ACETOPHOSPHONIC ACID) | — | 0.200 |
| VAZO 67 INITIATOR | — | 0.500 |
| QUINONES | 0.04 | — |
| SACCHARIN | 0.30 | — |
| PEROXIDE | 0.40 | — |
| TOTAL | 100.00 | 100.50 |

The Formula 3 composition then was formulated in the various compositions described in Table 5 below.

Table 5 sets out the concentration of monomer-soluble reactive bismaleimide, which included Thermax™ MB 7000 and Thermax™ MB 8000 bismaleimides (Mitsubishi Yuka America, Inc., New York, N.Y.), at the various identified concentrations (numbers given are percents by weight, based on weight of (meth)acrylic monomer in the composition). Sample 27 corresponds to Formula 3 of Table 4 without any bismaleimide modification, and Samples 28–31 comprised the Formula 3 composition as modified with the named bismaleimide material in the specified amount.

TABLE 5

| Sample No. | Bismaleimide Name, Concentration | Viscosity, Centipoise | Solubility @ Room Temperature |
|---|---|---|---|
| 27 | -- | 9.5 | OK |
| 28 | Thermax MB 7000 5% | 11.22 | OK |
| 29 | Thermax MB 7000 8% | 12.89 | OK |
| 30 | Thermax MB 8000 5% | 11.71 | after 75° C. heat |
| 31 | Thermax MB 8000 8% | 13.91 | after 75° C. heat |

Figure 5:
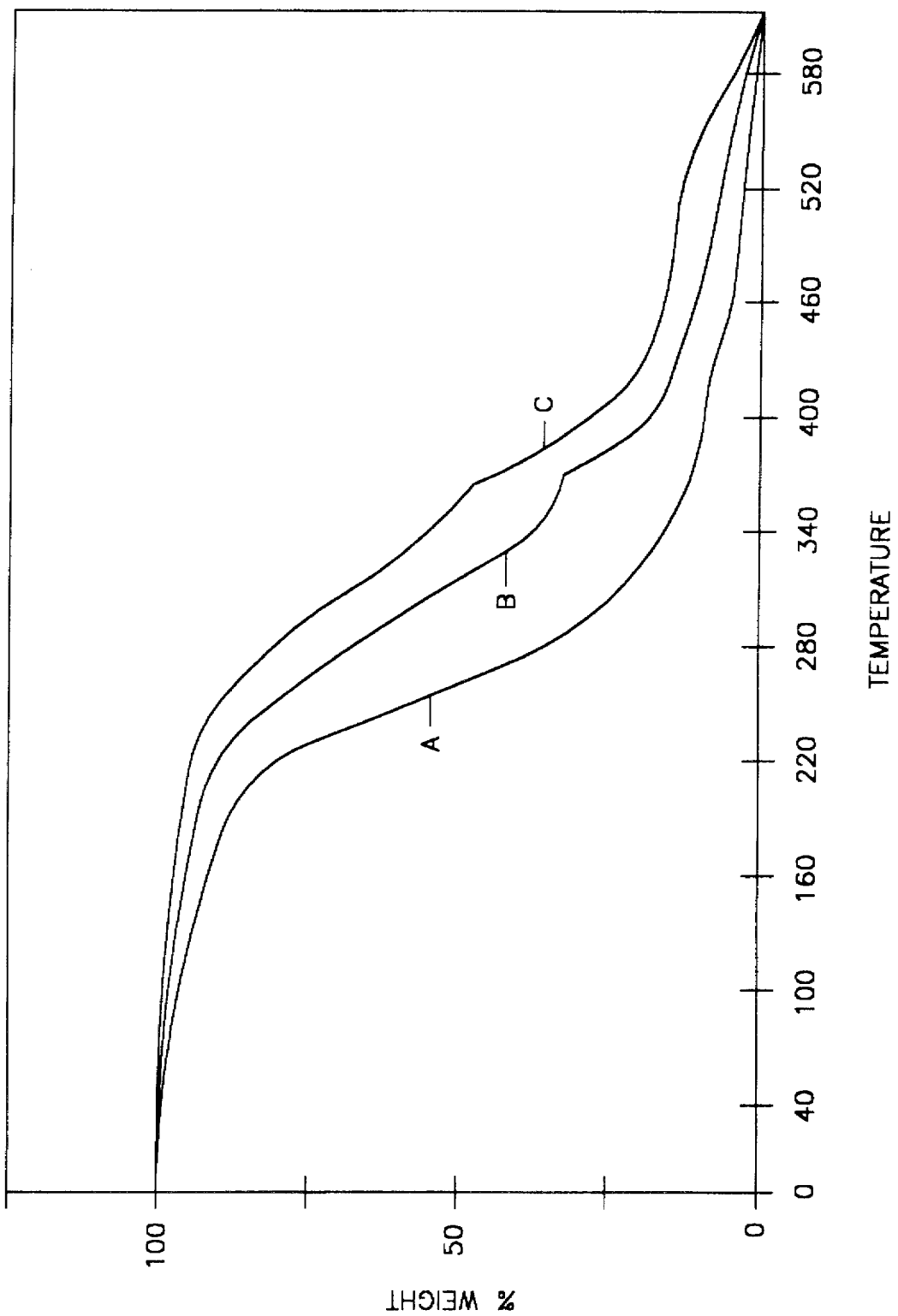
FIG. 5 is a thermal gravimetric analysis plot of data, showing curves for ambient temperature curable, anaerobic impregnation sealant compositions, plotted with percent of original weight as a function of temperature in degrees Centigrade.

The data in FIG. 5 show that the viscosity increases of samples containing bismaleimide (Samples 28–31) were proportional to the increase in concentration of the bismaleimide component, and again such viscosity increases did not result in excessive viscosity values (i.e., the viscosity values of Samples 28–31 were of acceptable character for porosity impregnation purposes).

Representative compositions based on Formula 3, viz., Samples 27, 28 and 29, next were subjected to testing by thermogravimetric analysis by the test method of ASTM E 1131-B6 ("Standard Test Method for Compositional Analysis by Thermogravimetry"), and the results are shown in FIG. 5 hereof.

FIG. 5 is a thermogravimetric analysis (TGA) plot of percent weight retention as a function of temperature in degrees Centigrade for Formula 3. Curve A represents the Formula 3 composition with no added bismaleimide (Sample 27). Curve B represents the Formula 3 composition with 5% addition of bismaleimide (Sample 28). Curve C represents the Formula 3 composition with 8% added bismaleimide (Sample 29).

As shown by the FIG. 5 curves, the unmodified Formula 3 composition (Sample 27), containing no bismaleimide therein, exhibited a substantially greater weight loss than the bismaleimide-modified compositions of Samples 28 and 29, with the percent of weight retained of the original (starting) formulation being higher with increasing bismaleimide concentration, reflecting the fact that such increasing levels of monomer-soluble reactive bismaleimide resulted in less degradative loss of mass of the composition. Thus, these results also showed the substantial increase in high temperature resistance of the bismaleimide-containing ambient temperature curable anaerobic compositions over the corresponding unmodified composition at high temperature levels on the order of 300° C. and higher.

Although the invention has been described with reference to specific aspects, features, and embodiments, it will be appreciated that the invention is not thus limited, and that other modifications, variations, and embodiments are possible. Accordingly, the invention is to be broadly construed to encompass all such alternative modifications, variations, and embodiments within its spirit and scope.

What is claimed is:

1. A curable impregnation sealant composition, comprising a curable monomer adapted for curing by heat and/or absence of oxygen, and a curable monomer-soluble reactive bismaleimide in a solubilized amount providing enhanced high temperature resistance in the impregnation sealant composition when cured, said curable monomer-soluble reactive bismaleimide having the formula:

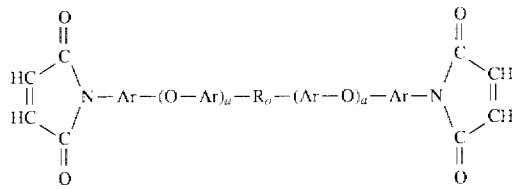

wherein: a is an integer having a value of from 0 to 2; Ar is arylene; and $R_O$ is $C_1$–$C_4$ alkylene, and wherein the concentration of the monomer-soluble reactive bismaleimide in the impregnation sealant composition is from 1% to about 25% by weight, based on the weight of the curable monomer, and wherein the bismaleimide is soluble at room temperature.

2. A composition according to claim 1, wherein the concentration of the monomer-soluble reactive bismaleimide in the impregnation sealant composition is from about 1 to about 15% by weight, based on the weight of the curable monomer.

3. A composition according to claim 1, wherein the concentration of the monomer-soluble reactive bismaleimide in the impregnation sealant composition is from about 2 to about 12% by weight, based on the weight of the curable monomer.

4. A composition according to claim 1, wherein the concentration of the monomer-soluble reactive bismaleimide in the impregnation sealant composition is from about 5 to about 10% by weight, based on the weight of the curable monomer.

5. A composition according to claim 1, wherein Ar is phenylene.

6. A composition according to claim 1, wherein Ar is phenylene substituted with $C_1$–$C_4$ alkyl substituents.

7. A composition according to claim 1, wherein linking moiety, —Ar—(O—Ar)$_a$—R$^O$—(Ar—O)$_a$—Ar— is selected from the group consisting of:

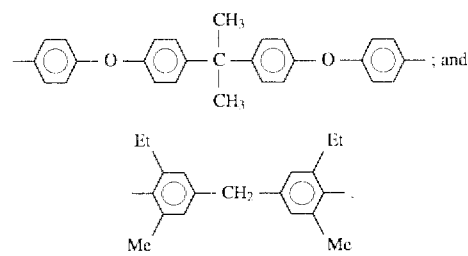

8. A composition according to claim 1, wherein the curable monomer is a heat-curable monomer.

9. A composition according to claim 1, wherein the curable monomer is curable in the substantial absence of oxygen.

10. A composition according to claim 1, wherein the curable monomer comprises (meth)acrylic monomer.

11. A composition according to claim 1, wherein the composition yields a TGA plot including a percent weight value at of at least 30% at 300° C. and at least 15% at 400° C.

12. A curable impregnation sealant composition, consisting essentially of:
(i) a polymerizable (meth)acrylic acid ester monomer;
(ii) an azo initiator;
(iii) a sterically-hindered phenol;
(iv) a metal ion chelator; and
(v) a high temperature resistance-enhancing amount of a reactive bismaleimide which is soluble in the (meth)acrylic acid ester monomer in said amount, said monomer-soluble reactive bismaleimide having the terminal maleimide groups separated by a linking moiety comprising a polyarylene chain, and wherein the bismaleimide is soluble at room temperature.

13. A curable impregnation sealant composition, consisting essentially of:
(i) a polymerizable (meth)acrylic acid ester monomer;
(ii) a peroxy initiator;
(iii) a polymerization accelerator; and
(iv) a polymerization inhibitor;
(v) a high temperature resistance-enhancing amount of a reactive bismaleimide which is soluble in the (meth)acrylic acid ester monomer in said amount, wherein the concentration of the monomer-soluble reactive bismaleimide in the impregnation sealant composition is from 1% to about 25% by weight, based on the weight of the curable monomer, and wherein the bismaleimide is soluble at room temperature.

14. A method of providing enhanced high temperature resistance in a cured impregnation sealant composition formed by curing by heat and/or absence of oxygen of a curable impregnation sealant composition including a curable monomer, comprising incorporating in the curable impregnation sealant an amount of a curable monomer-soluble reactive bismaleimide which is effective to provide such enhanced high temperature resistance to cured impregnation sealant composition, said monomer soluble reactive bismaleimide having the formula:

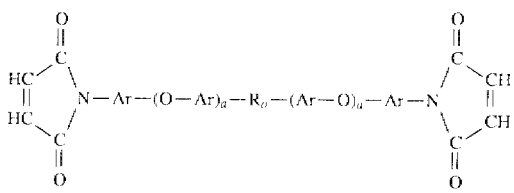

wherein: a is an integer having a value of from 0 to 2; Ar is arylene; and $R_o$ is $C_1$–$C_4$ alkylene, and wherein the concentration of the monomer-soluble reactive bismaleimide in the impregnation sealant composition is from 1% to about 25% by weight, based on the weight of the curable monomer, and wherein the bismaleimide is soluble at room temperature.

15. A method according to claim 14, wherein the concentration of the monomer-soluble reactive bismaleimide incorporated in the impregnation sealant composition is from about 1 to about 15% by weight, based on the weight of the curable monomer.

16. A method according to claim 14, wherein the concentration of the monomer-soluble reactive bismaleimide incorporated in the impregnation sealant composition is from about 2 to about 12% by weight, based on the weight of the curable monomer.

17. A method according to claim 14, wherein the concentration of the monomer-soluble reactive bismaleimide incorporated in the impregnation sealant composition is from about 5 to about 10% by weight, based on the weight of the curable monomer.

* * * * *

UNITED STATES PATENT AND TRADEMARK OFFICE
CERTIFICATE OF CORRECTION

PATENT NO. : 5,618,857
DATED      : April 8, 1997
INVENTOR(S) : Newberth, III et al.

It is certified that error appears in the above-indentified patent and that said Letters Patent is hereby corrected as shown below:

Column 1, Line 55        change "3.672,942 to -- 3,672,942 --
Column 2, Line 17        change "in" to -- In --

Column 8, Line 19        change "iso-propyi" to -- iso-propyl --
Column 10, Line 29/30    change "(meth-" to -- (meth) --
Column 16, Line 44       change "R°" to -- $R_o$ --

Signed and Sealed this

Twenty-seventh Day of January, 1998

Attest:

BRUCE LEHMAN

Attesting Officer        Commissioner of Patents and Trademarks